(12) United States Patent
Saito (10) Patent No.: US 6,956,703 B2
(45) Date of Patent: Oct. 18, 2005

(54) OBJECTIVE LENS FOR ENDOSCOPE

(75) Inventor: Shinichi Saito, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/855,484

(22) Filed: May 28, 2004

(65) Prior Publication Data

US 2004/0240081 A1 Dec. 2, 2004

(30) Foreign Application Priority Data

May 30, 2003 (JP) ........................................ 2003-154925

(51) Int. Cl.$^7$ ............................................. G02B 21/02
(52) U.S. Cl. ..................................... 359/660; 359/770
(58) Field of Search ................................ 359/660, 782, 359/783, 659, 763, 770

(56) References Cited

U.S. PATENT DOCUMENTS

| | | | | |
|---|---|---|---|---|
| 4,764,001 A | * | 8/1988 | Yokota ........................ | 359/740 |
| 4,984,878 A | * | 1/1991 | Miyano ...................... | 359/783 |
| 5,296,971 A | | 3/1994 | Mori .......................... | 359/716 |
| 5,587,839 A | * | 12/1996 | Miyano et al. ............. | 359/660 |
| 5,777,797 A | | 7/1998 | Miyano ...................... | 359/660 |
| 6,181,481 B1 | * | 1/2001 | Yamamoto et al. ......... | 359/661 |

FOREIGN PATENT DOCUMENTS

| | | |
|---|---|---|
| JP | 01-007828 | 7/1990 |
| JP | 62-117629 | 11/1998 |

* cited by examiner

Primary Examiner—Georgia Epps
Assistant Examiner—M. Hasan
(74) Attorney, Agent, or Firm—Kenyon & Kenyon

(57) ABSTRACT

An objective lens for endoscopes comprises a front lens unit component and a rear lens unit component, between which a stop is located, wherein a front lens unit component comprises, in order from the object side, a first lens having a negative refractive power and a second lens having a positive refractive power which directs a surface of the small radius of curvature toward the object side; wherein a rear lens unit component comprises a third lens having a positive refractive power which directs a surface of the small radius of curvature toward the image side, a fourth lens having a positive refractive power and a fifth lens having a negative refractive power; and wherein the fourth lens and the fifth lens are cemented, and satisfying the following condition:

$$2.0<|f_3/f|<3.0$$

where f is the composite focal length of the total system and $f_3$ is the focal length of the third lens.

12 Claims, 9 Drawing Sheets

OBJECTIVE LENS FOR ENDOSCOPE

This application claims priority to Japanese Patent Application No. 2003-154925 filed 30 May 2003, the content of which is incorporated herein by reference in its entirety.

BACKGROUND OF THE INVENTION

1) Field of the Invention

The present invention relates to an objective lens system for endoscopes which has a wide field angle, a short outer diameter, wherein the maximum ray height through the first lens is low, and which is further suitable for a small-sized image sensor.

2) Description of Related Art

With the reducing of the outer diameter of the insertion section of the Endoscope, various optical systems which have a short total length and a short outer diameter have been developed. Among compact optical systems for endoscopes known so far in the art, there are for example an objective lens having three units and four sheets shown in JP KOKAI SHO 63-281112 and JP KOKAI HEI 04-275514 and an objective lens having four units and five sheets shown in JP KOKAI HEI 02-188709.

At a front part of an endoscope, an objective lens, an illumination lens for illuminating a subject, a channel into which various operating supplies are inserted for treatment of affected part and an air and water feeding nozzle for removing waste material from a surface of an objective lens are generally arranged. Generally, endoscopes are designed to keep these parts, especially, the nozzle, out of field of view. In other words, the outer diameter can be made small by reducing the space between the nozzle and the objective lens, but can not be made small over the limit which is determined by the maximum ray height through the objective lens.

Figure 1:
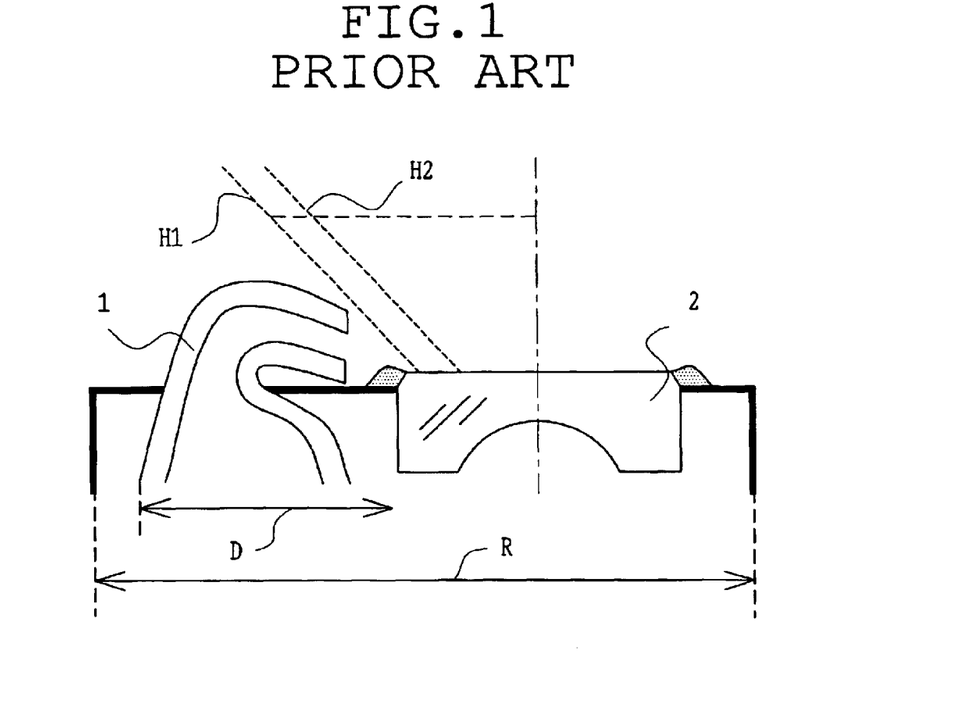
FIG. 1 is a sectional view schematically showing a layout of a front part of an endoscope.

FIG. 1 represents a sectional view schematically showing a layout of the front part of an endoscope. In FIG. 1, 1 is a nozzle, 2 is a first lens of the objective optical system, H1 is a line which represents the maximum ray height from an optical axis of an objective optical system, H2 is a line which represents the maximum ray height from an optical axis of another objective optical system, D is a distance from the first lens 2 to the nozzle 1, and R is an outer diameter of the front part of the endoscope. As is clear from FIG. 1, a distance D is restricted by the ray height H1 or H2. The optical system wherein the ray height is shown by H2, that is, an optical system having the lower ray height allows the separation D to be narrowed, accordingly allows the outer diameter R of the front part of the endoscope to be reduced.

Figure 2:
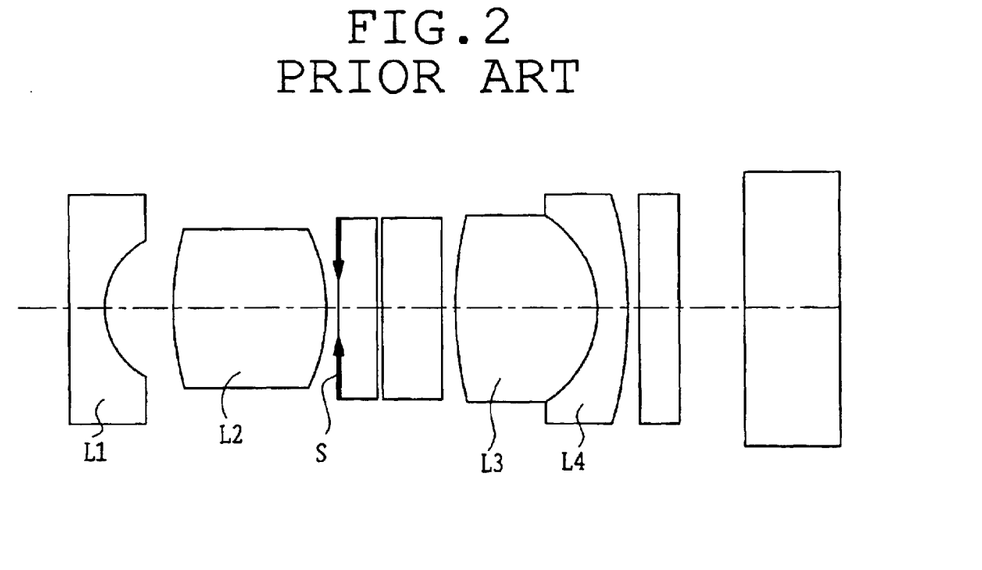
FIG. 2 is a view schematically showing an example of a conventional optical system for endoscopes.

FIG. 2 represents a sectional view of the objective system shown in JP KOKAI HEI 04-275514. As is clear from FIG. 2, this objective system comprises a second lens L2 having a positive refractive power and a cemented lens L3, L4, between which a stop S is located.

Figure 3:
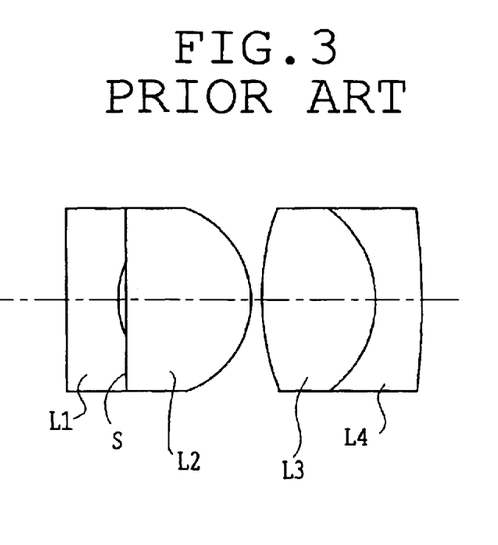
FIG. 3 is a view schematically showing another example of a conventional optical system for endoscopes.

FIG. 3 represents a sectional view of the objective system shown in JP KOKAI SHO 63-281112. As is clear from FIG. 3, this objective system comprises a first lens L1 and a second lens L2, between which a stop S is located. Because a distance from the first lens L1 to the stop S is short, the ray height through the first lens L1 is lowered.

Besides, recently, with the reducing of the outer diameter of the front part of endoscope, a small-sized image sensor for endoscopes (hereinafter referred to as CCD) is developed, and the pixel pitch is getting small every year. According to an on-chip color filtering CCD wherein a filter is positioned on a light-receiving element, the range of permissible value in relation to an angle of incidence (hereinafter referred to as an oblique incidence condition) is getting narrow.

Figure 4:
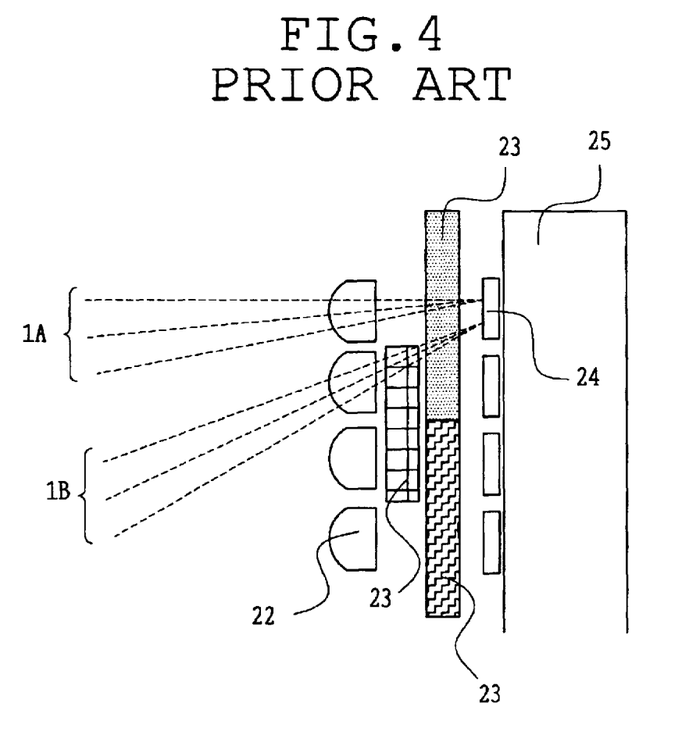
FIG. 4 is a sectional view showing a common on-chipped color filtering CCD.

FIG. 4 represents a sectional view of a common on-chip color filtering CCD. In FIG. 4, 1A, 1B is a light beam, 22 is a microlens, 23 is an on-chip filter, 24 is a light-receiving element, and 25 is a CCD board. A light beam which enters a CCD is condensed by the microlens 22, colored optimally by an on-chip filter 23 and converted to an electrical signal by the light-receiving element 24. The on-chipped filter 23 and the light-receiving element 24 are located regularly; hereby a conversion of color information of an object to be imaged to a color image is achieved. The light beam 1A enters the light-receiving element 24 through the corresponding color filter, and is readout as a normal color. This situation satisfies the oblique incidence condition of CCD. In contrast to this, since the light beam 1B enters the light-receiving element 24 through a not-corresponding color filter, a normally necessity color is not obtained and a color shading occurs. In this case, the light beam 1B does not satisfy the oblique incidence condition of CCD. This means that, if a ray which does not satisfy the oblique incidence condition enters a CCD, a mottling structurally occurs within the screen by color shading. This mottling interferes diagnosis of affected part, thus, a design which satisfies permissible value is desired especially in endoscopes.

Figure 5:
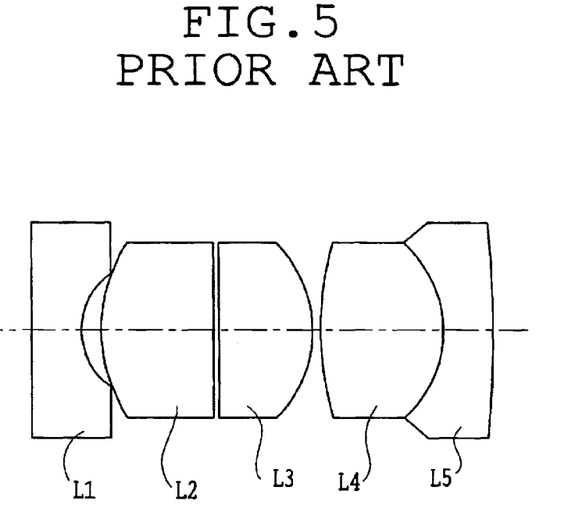
FIG. 5 is a view schematically showing another example of a conventional optical system for endoscopes.

FIG. 5 represents a sectional view objective system shown in JP KOKAI HEI 02-188709. In this lens system, for the purpose of shortening a total length, power of each lens L1–L5 is made to be strong.

SUMMARY OF THE INVENTION

The objective lens for endoscopes according to the present invention comprises a front lens unit component and a rear lens unit component, between which a stop is located, wherein the front lens unit component comprises, in order from the object side, a first lens having a negative refractive power and a second lens having a positive refractive power which directs a surface of the small radius of curvature toward the object side, wherein the rear lens unit component comprises a third lens having a positive refractive power which directs a surface of the small radius of curvature toward the image side, a fourth lens having a positive refractive power and a fifth lens having a negative refractive power, wherein the fourth lens and the fifth lens are cemented. When f is the composite focal length of the total system, and $f_3$ is the focal length of the third lens, the following condition (1) is satisfied:

$$2.0 < |f_3/f| < 3.0 \tag{1}$$

The objective lens for endoscopes according to the present invention comprises a front lens unit component and a rear lens unit component, between which a stop is located, wherein the front lens unit component comprises, in order from the object side, a first lens having a negative refractive power and a second lens having a positive refractive power which directs a surface of the small radius of curvature toward the object side, wherein the rear lens unit component comprises a third lens having a positive refractive power which directs a surface of the small radius of curvature toward the image side, a fourth lens having a positive refractive power and a fifth lens having a negative refractive power, wherein the fourth lens and the fifth lens are cemented. When f is a composite focal length of the total system, $f_3$ is a focal length of the third lens, and $d_F$ is a distance from a top surface of the large radius of curvature of the first lens to the stop (an air-converted length) and IH is a maximum image height on the imaging surface, following conditions (1)–(3) are satisfied:

$$2.0 < |f_3/f| < 3.0 \quad (1)$$

$$1.0 < |d_F/f| < 1.8 \quad (2)$$

$$0.8 < IH/f < 1.2 \quad (3)$$

According to the present invention, when the configuration satisfies above-mentioned conditions, an objective lens system for endoscopes which has a wide field angle, a short outer diameter, wherein a maximum ray height of the first lens is low, and which is further suitable for a small-sized image sensor can be obtained.

These and other features and advantages of the present invention will become apparent from the following detailed description of the preferred embodiments when taken in conjunction with the accompanying drawings.

DETAILED DESCRIPTION OF THE PREFERRED EMBODIMENTS

In accordance with the embodiments shown in the drawings, the present invention will be described below. Before undertaking the explanation of the embodiments, a description will be given of operation and effect of the present invention.

In order to lower the maximum ray height through the first lens, the present invention has first focused on the location of the stop. In order to lower the maximum ray height, a distance from the first lens to the stop may be reduced as much as possible. The conventional lens system as shown in FIG. 3 has a preferably short distance but gets too bad for balance with its performance. Furthermore, the conventional lens system as shown in FIG. 2 has a too much long distance from the first lens to the stop. Therefore, in order to keep balance between the ray height through the first lens and through the rear unit, an objective lens of the present invention divides into the front unit and the rear unit, between which the stop is located centrally.

And now the inconsistency of the angle of incidence to the CCD is determined by the thickness of lenses behind the stop or the inconsistency of decentering. In order to reduce the inconsistency of the angle of incidence to the CCD as much as possible, it is only necessary to reduce the power of lens behind the stop so that the influence of the thickness of lenses and the inconsistency of decentering is reduced. Therefore, an objective lens of the present invention limits the total length to practicable minimum as endoscopes and reduces each power of lenses as much as possible.

Each condition will be now explained. First, the third lens forms a principal imaging system of an objective lens of the present invention and its focal length materially affects the field angle and the performance. The condition (1) limits the range of the focal length of the third lens for rendering a field angle wide and reducing influence of the inconsistency of the angle of incidence to the CCD. Below the lower limit of the condition (1), the inconsistency of the angle of incidence to the CCD is reduced but the coma is increased, gets bad for correction and then it is impossible to get a wide field angle. On the contrary, above the upper limit the range of the inconsistency of the angle of incidence to the CCD is increased.

The condition (2) limits the range of the distance from the first lens to the stop S for minimizing the maximum ray height through the first lens and balancing with the maximum ray height through the rear lens unit. Then, below the lower limit of the condition (2), since the maximum ray height through the first lens becomes low, but it is required to make the outer diameter larger because the maximum ray height through the rear lens unit becomes high, and the compact functionality becomes impaired. Above the upper limit, the maximum ray height through the first lens becomes high.

The condition (3) limits the range of focal length in relation to the maximum image height for a wide field angle and a short total length of an objective lens. Above the upper limit of the condition (3), the total length of the objective lens becomes large. Below the lower limit, the field angle of the objective lens becomes small.

Beside the conditions (1) to (3), if the objective lens according to the present invention has a flat surface in the object side of the third lens having a positive refractive index or if it satisfies any one or some of the following conditions (4) to (6), and (6)', configuration more preferable on its performance and assembly is obtained.

$$3.0<|f_2/f|<10.0 \quad (4)$$

$$n_2<1.6 \text{ and } v_2>50 \quad (5)$$

$$1.2<d_{23}/f<1.7 \quad (6)$$

$$1.3<d_{23}/f<1.6 \quad (6')$$

Here, $f_2$ is the focal length of the second lens, $n_2$ is the d-line refractive index of the second lens, $v_2$ is the d-line Abbe's number of the second lens, $d_{23}$ is the distance from the top surface of the small radius of curvature of the second lens to that of the third lens (an air-converted length).

As mentioned above, the inconsistency of the lenses behind the stop affects the inconsistency of the angle of incidence to the CCD. Especially, a separation between surfaces at an image side just behind of the stop has a profound effect and in order to reduce inconsistency of the angle of incidence to the CCD, it is important to reduce the inconsistency of this separation between the surfaces. In order to reduce the inconsistency of the separation between the surfaces, the surface of the image side of the stop is desirable to be tight on the surface of the third lens. Consequently, the surface of the object side of the third lens may be flat and tight on the stop or the stop may be formed by vapour coating on the surface of the lens, to reduce the inconsistency.

The condition (4) limits the range of the focal length of the second lens for good aberration performance and avoiding excessive oversize of the total length. Below the lower limit of the condition (4), the spherical aberration caused by the second lens is increased. On the contrary, above the upper limit, the total length of the objective lens becomes large.

An optical system (FIG. 5) disclosed in JP KOKAI HEI 02-188709 uses glass material with high dispersion in the second lens. If the glass material with high refractive index and high dispersion is used in the second lens, the power of lens becomes strong, that is responsible for a short total length and also useful in compensation of the chromatic aberration of magnification. This objective lens has a large maximum image height in contrast to the total length and the outer diameter of the optical system and hence it is thought that the chromatic aberration of magnification needs to be well corrected. But, this optical system attaches so much importance on the chromatic aberration of magnification that the correction of axial chromatic aberration is insufficient.

The objective lens according to the present invention corrects the chromatic aberration of magnification and the axial chromatic aberration in a balanced manner so as to obtain an image being well from the center of the screen to the periphery. That is, by using glass material with low dispersion in the second lens, the axial chromatic aberration is well corrected.

The condition (5) limits the ranges of the d-line refractive index and the Abbe's number of the second lens, the refractive index is for obtaining appropriate back-focus. If the refractive index is above the upper limit of the condition (5), a separation enough for adjustment of positioning an image surface at setting up is not able to be obtained because the back-focus is decreased. And if the Abbe's number is below the lower limit of the condition (5), the axial chromatic aberration gets bad.

For efficient correction of the astigmatism, the front lens unit and the rear lens unit may be formed nearly symmetrically, between which the stop is located centrally. The condition (6) limits the thickness of the second lens and the third lens and the range of the separation of surfaces between the second lens and the third lens for optimizing the position of the second lens and the third lens, between which a stop is located centrally and showing the range where the astigmatism is well corrected. Above the upper limit of the condition (6), the astigmatism increases on the over side. If the condition (6) changes into (6'), the astigmatism is preferably further decreased.

Hereinafter, preferred embodiments of the objective lens for endoscopes according to the present invention will be explained with reference to FIGS. 6–16.

First Embodiment

Figure 6:
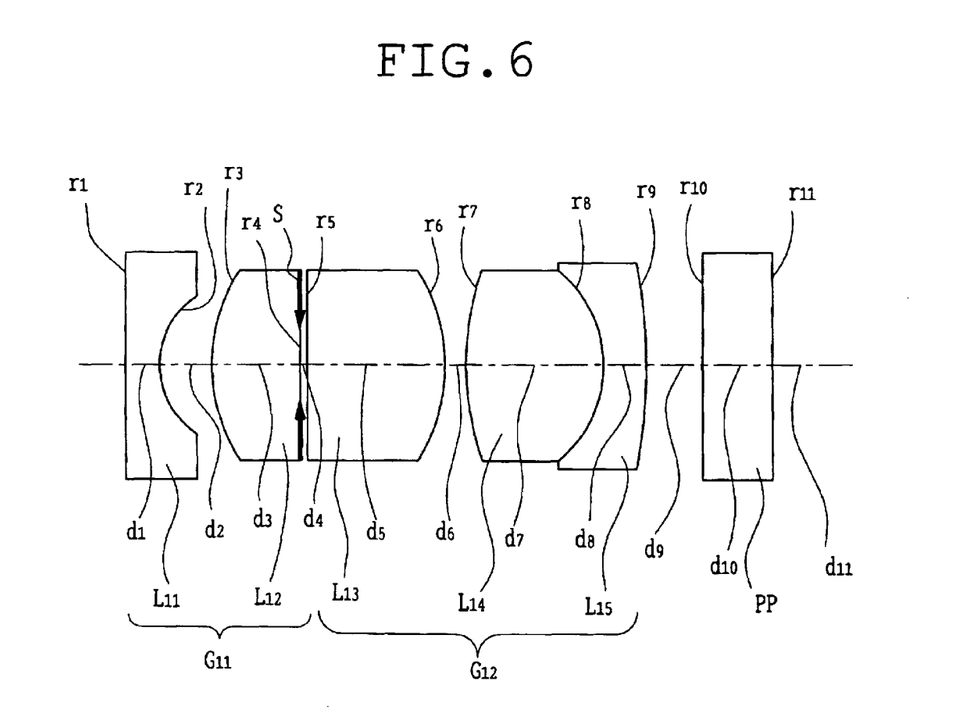
FIG. 6 is a sectional view showing the optical arrangement, developed along the optical axis, of an objective lens for endoscopes in a first embodiment of the present invention.

FIG. 6 is a sectional view showing the arrangement, developed along the optical axis, of an objective lens for endoscopes in the first embodiment of the present invention.

In FIG. 6, this objective lens system in the first embodiment comprises a front lens unit component G11 and a rear lens unit component G12, between which an aperture stop S is located. The front lens unit component G11 comprises, in order from the object side, a first lens L11 having a negative refractive power and a second lens L12 having a positive refractive power which directs a surface of the small radius of curvature toward the object side, and a rear lens unit component G12 comprises a third lens L13 having a positive refractive power which directs a surface of the small radius of curvature toward the image side, a fourth lens L14 having a positive refractive power and a fifth lens L15 having a negative refractive power. The fourth lens L14 and the fifth lens L15 are cemented. Behind the second lens unit component G12, a plane parallel plate PP is arranged.

Subsequently, numerical data of optical members constituting the optical system are shown below. In these numerical data in the first embodiment, $r_1, r_2 \ldots$ denote radius of curvature of surfaces of individual lens components; $d_1, d_2 \ldots$ denote thickness of individual lens components or air spacing between them; $n_{d1}, n_{d2} \ldots$ denote refractive indexes of individual lens component at the d-line; $v_{d1}, v_{d2} \ldots$ denote Abbe's numbers of individual lens component; Fno. denotes the F-number; f denotes the focal length of the total system. A unit of r, d, and f is "mm".

These symbols are also used for the numerical data of other embodiments to be described later.

Numeral data 1 focal length f = 1 mm, Fno. = 3.67, field angle ω = 108°
$r_1 = \infty$
$d_1 = 0.3507 \quad n_{d1} = 1.883 \quad v_{d2} = 40.76$
$r_2 = 0.8101$ -continued Numeral data 1

$d_2 = 0.5436$
$r_3 = 1.9831$
$d_3 = 0.8767$    $n_{d3} = 1.514$    $\nu_{d3} = 75$
$r_4 = \infty$ (stop)
$d_4 = 0.0526$
$r_5 = \infty$
$d_5 = 1.4027$    $n_{d5} = 1.883$    $\nu_{d5} = 40.76$
$r_6 = -2.062$
$d_6 = 0.2104$
$r_7 = 3.0106$
$d_7 = 1.4027$    $n_{d7} = 1.755$    $\nu_{d7} = 52.32$
$r_8 = -1.2975$
$d_8 = 0.4384$    $n_{d8} = 1.92286$    $\nu_{d8} = 18.9$
$r_9 = -6.8418$
$d_9 = 0.5786$
$r_{10} = \infty$
$d_{10} = 0.7014$    $n_{d10} = 1.51633$    $\nu_{d10} = 64.14$
$r_{11} = \infty$
$d_{11} = 0.447$
$|f_2/f| = 3.86, |f_3/f| = 2.34, |d_F/f| = 1.31, IH/f = 0.84,$
$d_{23}/f = 1.38$

Second Embodiment

Figure 7:
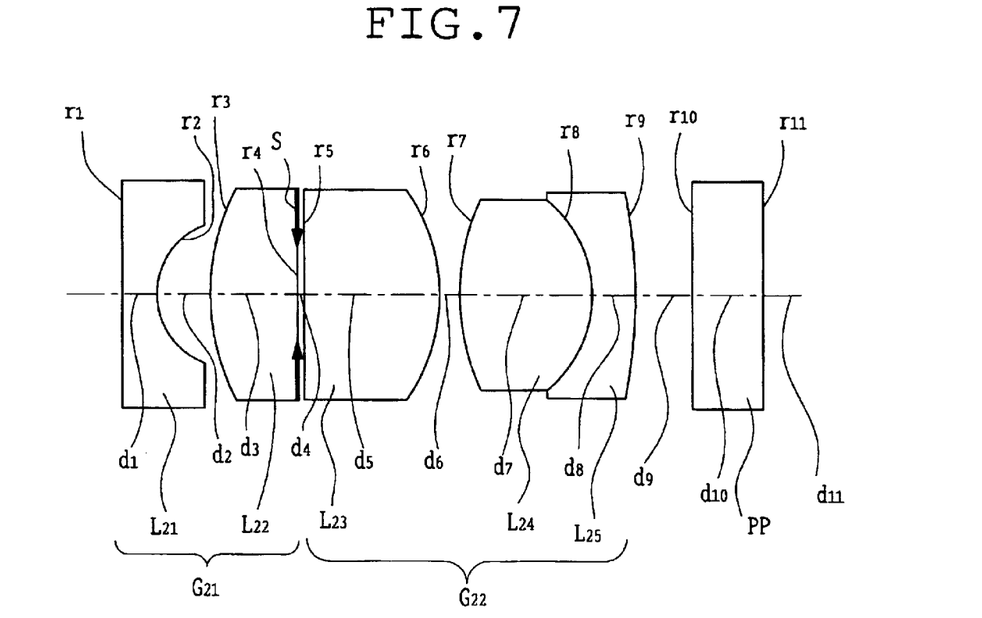
FIG. 7 is a sectional view showing the optical arrangement, developed along the optical axis, of an objective lens for endoscopes in a second embodiment of the present invention.

FIG. 7 is a sectional view showing the arrangement, developed along the optical axis, of an objective lens for endoscopes in the second embodiment of the present invention.

In FIG. 7, this objective lens system in the second embodiment comprises a front lens unit component G21 and a rear lens unit component G22, between which an aperture stop S is located. The front lens unit G21 comprises, in order from the object side, a first lens L21 having a negative refractive power and a second lens L12 having a positive refractive power which directs a surface of the small radius of curvature toward the object side, and a rear lens unit component G22 comprises a third lens L23 having a positive refractive power which directs a surface of the small radius of curvature toward the image side, a fourth lens L24 having a positive refractive power and a fifth lens L25 having a negative refractive power. The fourth lens L24 and the fifth lens L25 are cemented. Behind the second lens unit component G22, a plane parallel plate PP is arranged. In this embodiment, glass material with good workability is used for improving productivity.

Numeral data 2 focal length f = 1 mm, Fno. = 3.68, field angle $\omega = 115°$
$r_1 = \infty$
$d_1 = 0.3639$    $n_{d1} = 1.883$    $\nu_{d2} = 40.76$
$r_2 = 0.8407$
$d_2 = 0.5277$
$r_3 = 2.4321$
$d_3 = 0.9099$    $n_{d3} = 1.514$    $\nu_{d3} = 75$
$r_4 = \infty$ (stop)
$d_4 = 0.0546$
$r_5 = \infty$
$d_5 = 1.4194$    $n_{d5} = 1.7725$    $\nu_{d5} = 49.6$
$r_6 = -1.8361$
$d_6 = 0.2184$
$r_7 = 2.7328$
$d_7 = 1.3648$    $n_{d7} = 1.72916$    $\nu_{d7} = 54.68$
$r_8 = -1.2793$
$d_8 = 0.4549$    $n_{d8} = 1.84666$    $\nu_{d8} = 23.78$
$r_9 = -11.569$
$d_9 = 0.5699$
$r_{10} = \infty$
$d_{10} = 0.7279$    $n_{d10} = 1.51633$    $\nu_{d10} = 64.14$ -continued Numeral data 2

$r_{11} = \infty$
$d_{11} = 0.4639$
$|f_2/f| = 4.73, |f_3/f| = 2.38, |d_F/f| = 1.32, IH/f = 0.87,$
$d_{23}/f = 1.46$

Third Embodiment

Figure 8:
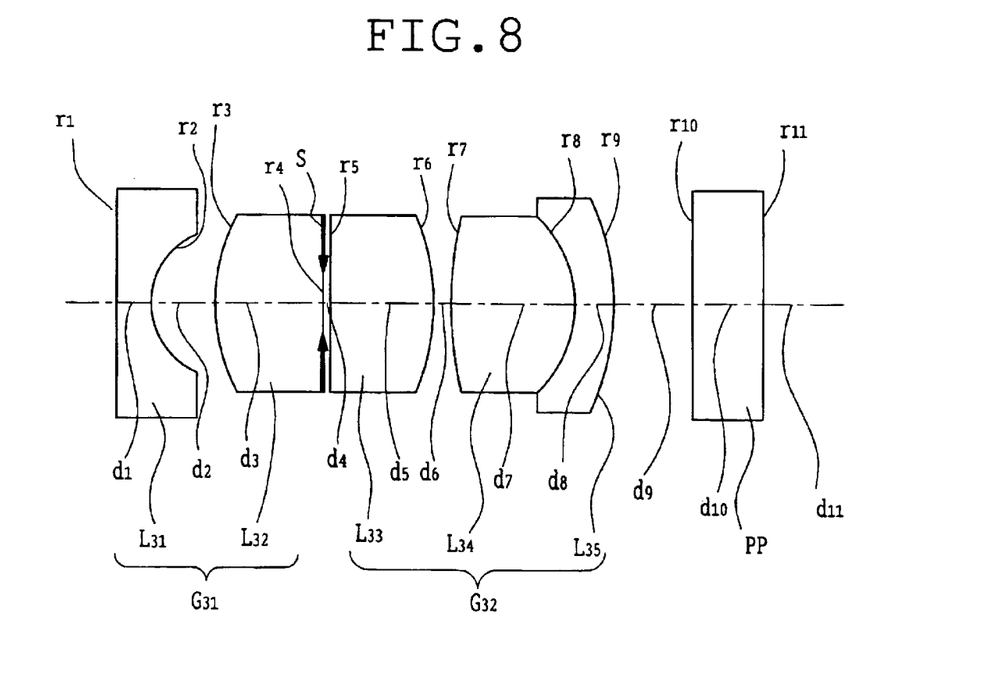
FIG. 8 is a sectional view showing the optical arrangement, developed along the optical axis, of an objective lens for endoscopes in a third embodiment of the present invention.

FIG. 8 is a sectional view showing the arrangement, developed along the optical axis, of an objective lens for endoscopes in the third embodiment of the present invention.

In FIG. 8, this objective lens system in the third embodiment comprises a front lens unit component G31 and a rear lens unit component G32, between which an aperture stop S is located. The front lens unit component G31 comprises, in order from the object side, a first lens component L31 having a negative refractive power and a second lens L32 having a positive refractive power which directs a surface of the small radius of curvature toward the object side, and a rear lens unit component G32 comprises a third lens L33 having a positive refractive power which directs a surface of the small radius of curvature toward the image side, a fourth lens L34 having a positive refractive power and a fifth lens L35 having a negative refractive power. The fourth lens L34 and the fifth lens L35 are cemented. Behind the second lens unit component G32, a plane parallel plate PP is arranged. The field angle of this embodiment is 131°.

Numeral data 3 focal length f = 1 mm, Fno. = 3.55, field angle $\omega = 131°$
$r_1 = \infty$
$d_1 = 0.3941$    $n_{d1} = 1.883$    $\nu_{d2} = 40.76$
$r_2 = 0.871$
$d_2 = 0.6897$
$r_3 = 2.0099$
$d_3 = 1.1823$    $n_{d3} = 1.51633$    $\nu_{d3} = 64.14$
$r_4 = \infty$ (stop)
$d_4 = 0.0591$
$r_5 = \infty$
$d_5 = 1.1429$    $n_{d5} = 1.883$    $\nu_{d5} = 40.76$
$r_6 = -2.4681$
$d_6 = 0.2168$
$r_7 = 4.2177$
$d_7 = 1.3794$    $n_{d7} = 1.755$    $\nu_{d7} = 52.32$
$r_8 = -1.4582$
$d_8 = 0.4335$    $n_{d8} = 1.92286$    $\nu_{d8} = 18.9$
$r_9 = -3.6015$
$d_9 = 0.8553$
$r_{10} = \infty$
$d_{10} = 0.7882$    $n_{d10} = 1.883$    $\nu_{d10} = 40.76$
$r_{11} = \infty$
$d_{11} = 0.5023$
$|f_2/f| = 3.89, |f_3/f| = 2.8, |d_F/f| = 1.68, IH/f = 0.94,$
$d_{23}/f = 1.45$

Fourth Embodiment

Figure 9:
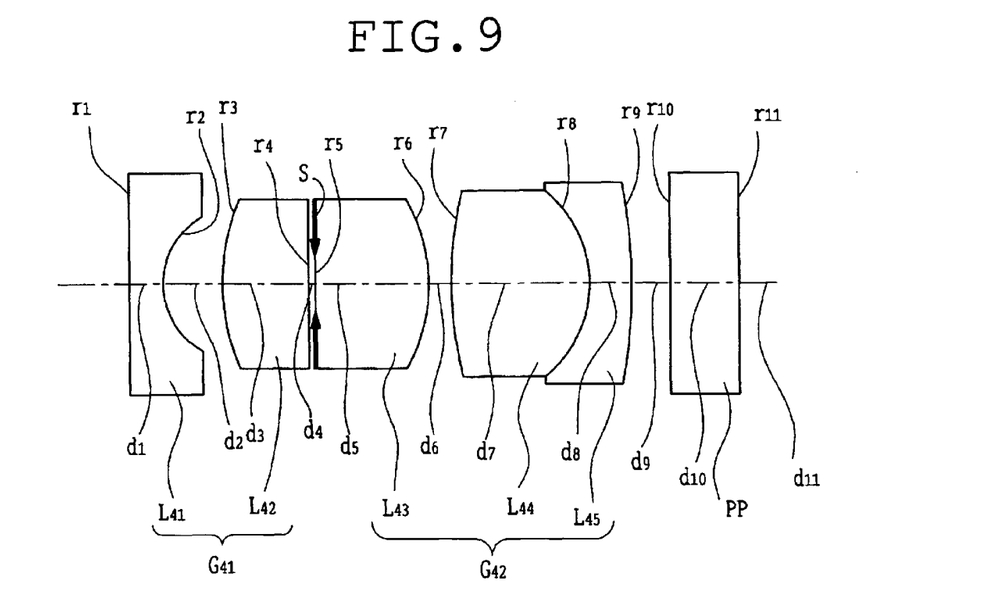
FIG. 9 is a sectional view showing the optical arrangement, developed along the optical axis, of an objective lens for endoscopes in a fourth embodiment of the present invention.

FIG. 9 is a sectional view showing the arrangement, developed along the optical axis, of an objective lens for endoscopes in the fourth embodiment of the present invention.

In FIG. 9, this objective lens system in the fourth embodiment comprises a front lens unit component G41 and a rear lens unit component G42, between which an aperture stop S is located. The front lens unit G41 comprises, in order from the object side, a first lens component L41 having a negative refractive power and a second lens L42 having a positive refractive power which directs a surface of the small radius of curvature toward the object side, and a rear lens unit G42 comprises a third lens L43 having a positive refractive power which directs a surface of the small radius of curvature toward the image side, a fourth lens L44 having a positive refractive power and a fifth lens L45 having a negative refractive power. The fourth lens L44 and the fifth lens L45 are cemented. Behind the second lens unit component G42, a plane parallel plate PP is arranged. The field angle of this embodiment is 130°.

| Numeral data 4 | | |
|---|---|---|
| focal length f = 1 mm, Fno. = 3.54, field angle ω = 130° | | |
| $r_1 = \infty$ | | |
| $d_1 = 0.3969$ | $n_{d1} = 1.883$ | $\nu_{d2} = 40.76$ |
| $r_2 = 0.9061$ | | |
| $d_2 = 0.6945$ | | |
| $r_3 = 2.512$ | | |
| $d_3 = 0.9922$ | $n_{d3} = 1.51633$ | $\nu_{d3} = 64.14$ |
| $r_4 = 32.2766$ | | |
| $d_4 = 0.0595$ | | |
| $r_5 = \infty$ (stop) | | |
| $d_5 = 1.389$ | $n_{d5} = 1.883$ | $\nu_{d5} = 40.76$ |
| $r_6 = -1.9069$ | | |
| $d_6 = 0.2381$ | | |
| $r_7 = 4.9854$ | | |
| $d_7 = 1.5875$ | $n_{d7} = 1.755$ | $\nu_{d7} = 52.32$ |
| $r_8 = -1.4684$ | | |
| $d_8 = 0.4961$ | $n_{d8} = 1.92286$ | $\nu_{d8} = 18.9$ |
| $r_9 = -5.1195$ | | |
| $d_9 = 0.4384$ | | |
| $r_{10} = \infty$ | | |
| $d_{10} = 0.7937$ | $n_{d10} = 1.51633$ | $\nu_{d10} = 64.14$ |
| $r_{11} = \infty$ | | |
| $d_{11} = 0.5059$ | | |
| $\lvert f_2/f \rvert = 5.22$, $\lvert f_3/f \rvert = 2.16$, $\lvert d_F/f \rvert = 1.56$, IH/f = 0.95, $d_{23}/f = 1.45$ | | |

Fifth Embodiment

Figure 10:
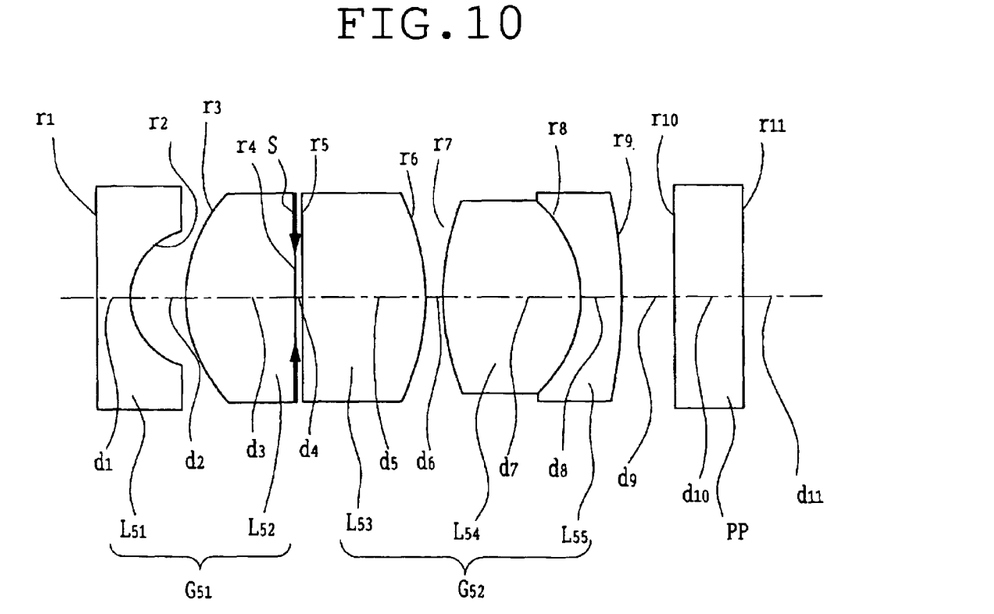
FIG. 10 is a sectional view showing the optical arrangement, developed along the optical axis, of an objective lens for endoscopes in a fifth embodiment of the present invention.

FIG. 10 is a sectional view showing the arrangement, developed along the optical axis, of an objective lens for endoscopes in the fifth embodiment of the present invention.

In FIG. 10, this objective lens system in the fifth embodiment comprises a front lens unit component G51 and a rear lens unit component G52, between which an aperture stop S is located. The front lens unit G51 comprises, in order from the object side, a first lens L51 having a negative refractive power and a second lens L52 having a positive refractive power which directs a surface of the small radius of curvature toward the object side, and a rear lens unit component G52 comprises a third lens L53 having a positive refractive power which directs a surface of the small radius of curvature toward the image side, a fourth lens L54 having a positive refractive power and a fifth lens L55 having a negative refractive power. The fourth lens L54 and the fifth lens L55 are cemented. Behind the second lens unit component G52, a plane parallel plate PP is arranged.

| Numeral data 5 | | |
|---|---|---|
| focal length f = 1 mm, Fno. = 3.66, field angle ω = 115° | | |
| $r_1 = \infty$ | | |
| $d_1 = 0.3592$ | $n_{d1} = 1.883$ | $\nu_{d2} = 40.76$ |
| $r_2 = 0.8188$ | | |
| $d_2 = 0.5567$ | | |
| $r_3 = 1.5696$ | | |
| $d_3 = 1.1562$ | $n_{d3} = 1.514$ | $\nu_{d3} = 75$ |
| $r_4 = \infty$ (stop) | | |
| $d_4 = 0.0539$ | | |
| $r_5 = \infty$ | | |
| $d_5 = 1.2571$ | $n_{d5} = 1.883$ | $\nu_{d5} = 40.76$ |
| $r_6 = -2.6256$ | | |
| $d_6 = 0.2155$ | | |
| $r_7 = 2.6054$ | | |
| $d_7 = 1.4367$ | $n_{d7} = 1.755$ | $\nu_{d7} = 52.32$ |
| $r_8 = -1.329$ | | |
| $d_8 = 0.449$ | $n_{d8} = 1.92286$ | $\nu_{d8} = 18.9$ |
| $r_9 = -5.1462$ | | |
| $d_9 = 0.5397$ | | |
| $r_{10} = \infty$ | | |
| $d_{10} = 0.7184$ | $n_{d10} = 1.51633$ | $\nu_{d10} = 64.14$ |
| $r_{11} = \infty$ | | |
| $d_{11} = 0.4578$ | | |
| $\lvert f_2/f \rvert = 3.05$, $\lvert f_3/f \rvert = 2.97$, $\lvert d_F/f \rvert = 1.51$, IH/f = 0.86, $d_{23}/f = 1.49$ | | |

Sixth Embodiment

Figure 11:
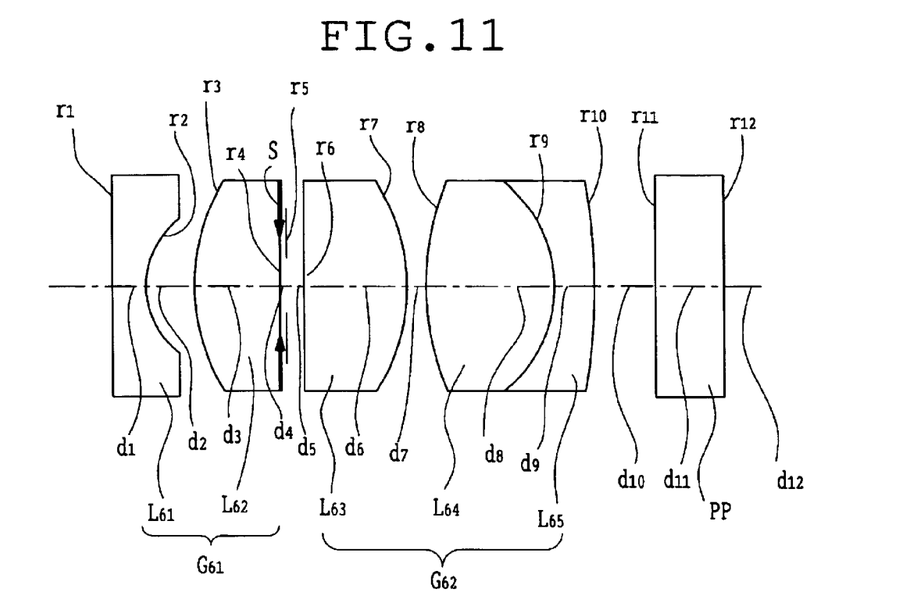
FIG. 11 is a sectional view showing the optical arrangement, developed along the optical axis, of an objective lens for endoscopes in a sixth embodiment of the present invention.

FIG. 11 is a sectional view showing the arrangement, developed along the optical axis, of an objective lens for endoscopes in the sixth embodiment of the present invention.

In FIG. 11, this objective lens system in the sixth embodiment comprises a front lens unit component G61 and a rear lens unit component G62, between which an aperture stop S is located. The front lens unit component G61 comprises, in order from the object side, a first lens component L61 having a negative refractive power and a second lens L62 having a positive refractive power which directs a surface of the small radius of curvature toward the object side, and a rear lens unit component G62 comprises a third lens L63 having a positive refractive power which directs a surface of the small radius of curvature toward the image side, a fourth lens L64 having a positive refractive power and a fifth lens L65 having a negative refractive power. The stop S is positioned on the side of the second lens L62. The fourth lens L64 and the fifth lens L65 are cemented. Behind the second lens unit component G62, a plane parallel plate PP is arranged.

In this embodiment, an air layer is between the second lens L62 and the third lens L63, which makes lens easier to maintain by a frame of metal and the like. In addition, each space between the surface of the second lens L62 and the stop S and between the stop S and the surface of the third lens L63 affects the inconsistency of the angle of incidence to the CCD and hence it is necessary to pay careful attention to setting dimensional tolerance of the frame.

| Numeral data 6 | | |
|---|---|---|
| focal length f = 1 mm, Fno. = 3.67, field angle ω = 115° | | |
| $r_1 = \infty$ | | |
| $d_1 = 0.364$ | $n_{d1} = 1.883$ | $\nu_{d2} = 40.76$ |
| $r_2 = 0.8044$ | | |
| $d_2 = 0.5096$ | | |
| $r_3 = 2.0164$ | | |
| $d_3 = 0.9099$ | $n_{d3} = 1.514$ | $\nu_{d3} = 75$ |
| $r_4 = \infty$ (stop) | | |
| $d_4 = 0.0546$ | | |
| $r_5 = \infty$ | | |
| $d_5 = 0.2184$ | | |
| $r_6 = \infty$ | | |
| $d_6 = 1.0919$ | $n_{d6} = 1.883$ | $\nu_{d6} = 40.76$ |
| $r_7 = -2.0164$ | | |
| $d_7 = 0.2184$ | | |
| $r_8 = 2.9864$ | | |
| $d_8 = 1.3649$ | $n_{d8} = 1.755$ | $\nu_{d8} = 52.32$ |

-continued

Numeral data 6

Figure 12:
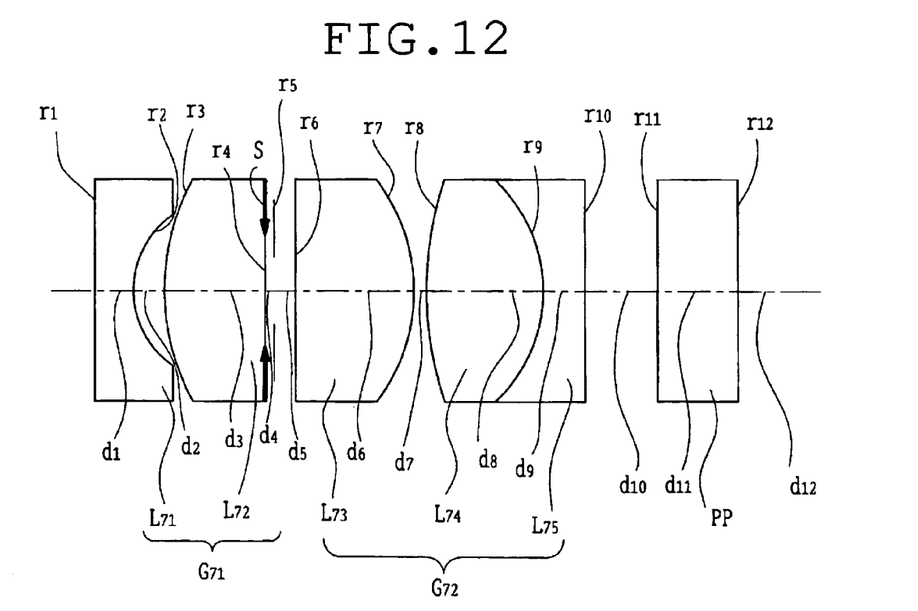
FIG. 12 is a sectional view showing the optical arrangement, developed along the optical axis, of an objective lens for endoscopes in a seventh embodiment of the present invention.

$r_9 = -1.3467$
$d_9 = 0.4004$  $n_{d9} = 1.92286$  $v_{d9} = 18.9$
$r_{10} = -9.0901$
$d_{10} = 0.6733$
$r_{11} = \infty$
$d_{11} = 0.7279$  $n_{d11} = 1.883$  $v_{d11} = 40.76$
$r_{12} = \infty$
$d_{12} = 0.4639$
$|f_2/f| = 3.92, |f_3/f| = 2.28, |d_F/f| = 1.3, IH/f = 0.87,$
$d_{23}/f = 1.45$ Seventh Embodiment FIG. 12 is a sectional view showing the arrangement, developed along the optical axis, of an objective lens for endoscopes in the seventh embodiment of the present invention.

In FIG. 12, this objective lens system in the seventh embodiment comprises a front lens unit component G71 and a rear lens unit component G72, between which an aperture stop S is located. The front lens unit component G71 comprises, in order from the object side, a first lens L71 having a negative refractive power and a second lens L72 having a positive refractive power which directs a surface of the small radius of curvature toward the object side, and a rear lens unit component G72 comprises a third lens L73 having a positive refractive power which directs a surface of the small radius of curvature toward the image side, a fourth lens L64 having a positive refractive power and a fifth lens L75 having a negative refractive power. The stop S is positioned on the side of the second lens L72. The fourth lens L74 and the fifth lens L75 are cemented. Behind the second lens unit component G72, a plane parallel plate PP is arranged.

In this embodiment, an air layer is between the second lens L72 and the third lens L73, which makes lens easier to maintain by a frame of metal and the like. In addition, each space between the second lens L72 and the stop S and between the stop S and the third lens L73 affects the inconsistency of the angle of incidence to the CCD and hence it is necessary to pay careful attention to setting dimensional tolerance of the frame. Though this embodiment is similar to the sixth embodiment in the constitution, the total length is shortened.

Numeral data 7 focal length f = 1 mm, Fno. = 3.71, field angle ω = 117°
$r_1 = \infty$
$d_1 = 0.3641$  $n_{d1} = 1.883$  $v_{d2} = 40.76$
$r_2 = 0.841$
$d_2 = 0.273$
$r_3 = 2.048$
$d_3 = 0.9101$  $n_{d3} = 1.48749$  $v_{d3} = 70.23$
$r_4 = \infty$ (stop)
$d_4 = 0.0546$
$r_5 = \infty$
$d_5 = 0.2184$
$r_6 = \infty$
$d_6 = 1.0558$  $n_{d6} = 1.7725$  $v_{d6} = 49.6$
$r_7 = -1.5665$
$d_7 = 0.1092$
$r_8 = 2.5939$
$d_8 = 1.0922$  $n_{d8} = 1.72916$  $v_{d8} = 54.68$
$r_9 = -1.2742$ -continued Numeral data 7

Figure 13:
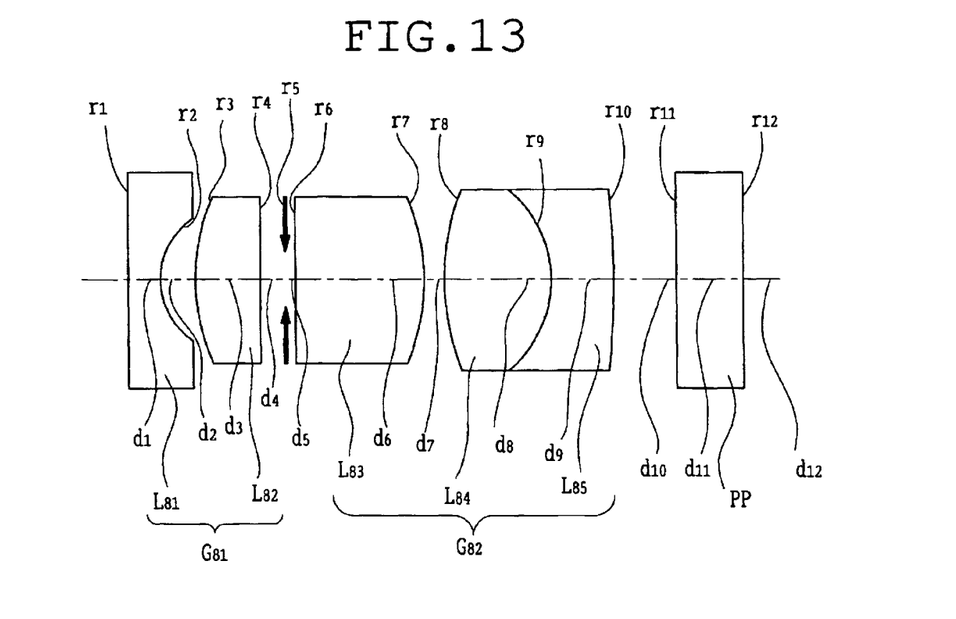
FIG. 13 is a sectional view showing the optical arrangement, developed along the optical axis, of an objective lens for endoscopes in a eighth embodiment of the present invention.

$d_9 = 0.3641$  $n_{d9} = 1.84666$  $v_{d9} = 23.78$
$r_{10} = -20.5007$
$d_{10} = 0.6553$
$r_{11} = \infty$
$d_{11} = 0.7281$  $n_{d11} = 1.883$  $v_{d11} = 40.76$
$r_{12} = \infty$
$d_{12} = 0.464$
$|f_2/f| = 4.2, |f_3/f| = 2.03, |d_F/f| = 1.08, IH/f = 0.87,$
$d_{23}/f = 1.48$ Eighth Embodiment FIG. 13 is a sectional view showing the arrangement, developed along the optical axis, of an objective lens for endoscopes in the eighth embodiment of the present invention.

In FIG. 13, this objective lens system in the eighth embodiment comprises a front lens unit component G81 and a rear lens unit component G82, between which an aperture stop S is located. The front lens unit component G81 comprises, in order from the object side, a first lens L81 having a negative refractive power and a second lens L82 having a positive refractive power which directs a surface of the small radius of curvature toward the object side, and a rear lens unit component G82 comprises a third lens L83 having a positive refractive power which directs a surface of the small radius of curvature toward an image side, a fourth lens L84 having a positive refractive power and a fifth lens L85 having a negative refractive power. The stop S is positioned on the side of the third lens L83. The fourth lens L84 and the fifth lens L85 are cemented. Behind the second lens unit component G82, a plane parallel plate PP is arranged.

This embodiment is similar to those shown in the sixth and the seventh embodiments except that the stop S is positioned on the side of the third lens L83. In this embodiment, the stop S is positioned as mentioned above, and hence the range of the inconsistency of the angle of incidence to the CCD is preferably narrower than in the sixth and the seventh embodiments.

Numeral data 8 focal length f = 1, Fno. = 3.67, field angle ω = 116°
$r_1 = \infty$
$d_1 = 0.3631$  $n_{d1} = 1.883$  $v_{d2} = 40.76$
$r_2 = 0.8024$
$d_2 = 0.3631$
$r_3 = 2.1189$
$d_3 = 0.7262$  $n_{d3} = 1.51633$  $v_{d3} = 64.14$
$r_4 = \infty$
$d_4 = 0.2723$
$r_5 = \infty$ (stop)
$d_5 = 0.0545$
$r_6 = \infty$
$d_6 = 1.4523$  $n_{d6} = 1.883$  $v_{d6} = 40.76$
$r_7 = -1.9299$
$d_7 = 0.2178$
$r_8 = 2.9537$
$d_8 = 1.1269$  $n_{d8} = 1.72916$  $v_{d8} = 54.68$
$r_9 = -1.3051$
$d_9 = 0.7$  $n_{d9} = 1.84666$  $v_{d9} = 23.78$
$r_{10} = -10.753$
$d_{10} = 0.6789$
$r_{11} = \infty$
$d_{11} = 0.7262$  $n_{d11} = 1.883$  $v_{d11} = 40.76$
$r_{12} = \infty$ -continued Numeral data 8

$d_{12} = 0.4628$    $n_{d12} = 1$
$|f_2/f| = 4.1, |f_3/f| = 2.19, |d_F/f| = 1.31, IH/f = 0.87,$
$d_{23}/f = 1.58$

Ninth Embodiment

Figure 14:
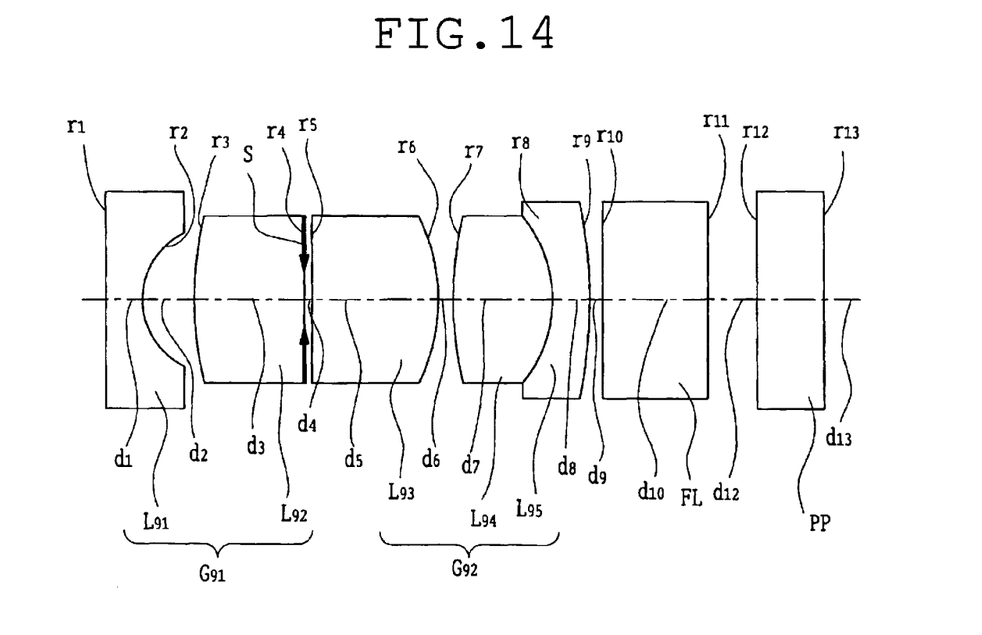
FIG. 14 is a sectional view showing the optical arrangement, developed along the optical axis, of an objective lens for endoscopes in a ninth embodiment of the present invention.

FIG. 14 is a sectional view showing the arrangement, developed along the optical axis, of an objective lens for endoscopes in the ninth embodiment of the present invention.

In FIG. 14, this objective lens system comprises a front lens unit component G91 and a rear lens unit component G92, between which an aperture stop S is located. The front lens unit component G91 comprises, in order from the object side, a first lens L91 having a negative refractive power and a second lens L92 having a positive refractive power which directs a surface of the small radius of curvature toward the object side, and a rear lens unit component G92 comprises a third lens L93 having a positive refractive power which directs a surface of the small radius of curvature toward the image side, a fourth lens L94 having a positive refractive power and a fifth lens L95 having a negative refractive power. The stop S is positioned on the side of the second lens L92. The fourth lens L94 and the fifth lens L95 are cemented. Behind the second lens unit component G92, that is, behind the fifth lens L95, a filter FL is arranged and behind thereof, a plane parallel plate PP is arranged. The filter FL is for example, an infrared cutoff filter.

Figure 15:
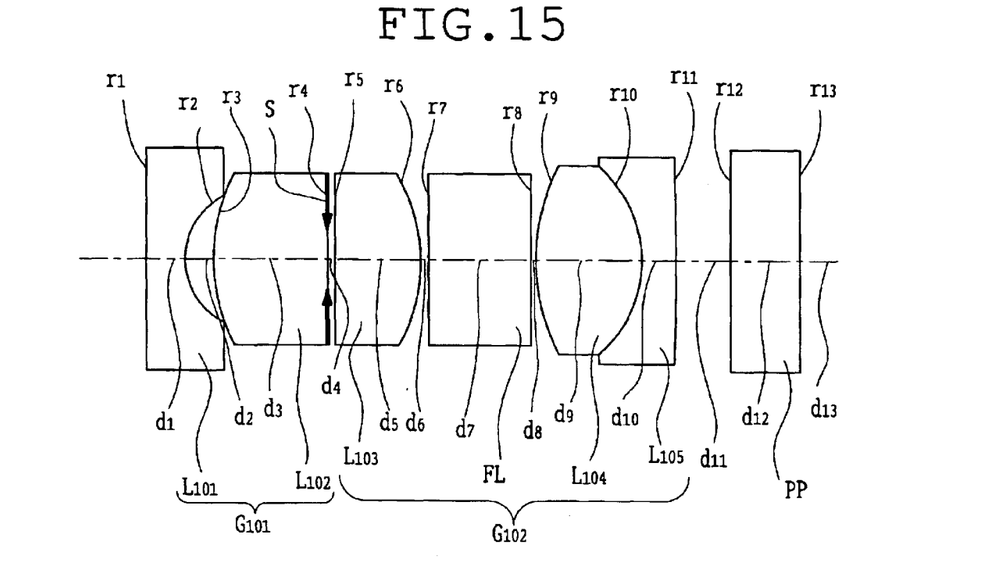
FIG. 15 is a sectional view showing the optical arrangement, developed along the optical axis, of an objective lens for endoscopes in a tenth embodiment of the present invention.

Numeral data 9 focal length f = 1 mm, Fno. = 3.68, field angle ω = 117°
$r_1 = \infty$
$d_1 = 0.3693$    $n_{d1} = 1.883$    $v_{d2} = 40.76$
$r_2 = 0.8161$
$d_2 = 0.6093$
$r_3 = 3.763$
$d_3 = 1.2002$    $n_{d3} = 1.51633$    $v_{d3} = 64.14$
$r_4 = \infty$ (stop)
$d_4 = 0.0554$
$r_5 = \infty$
$d_5 = 1.3848$    $n_{d5} = 1.883$    $v_{d5} = 40.76$
$r_6 = -2.2449$
$d_6 = 0.1662$
$r_7 = 4.1581$
$d_7 = 1.1078$    $n_{d7} = 1.755$    $v_{d7} = 52.32$
$r_8 = -1.3663$
$d_8 = 0.4062$    $n_{d8} = 1.84666$    $v_{d8} = 23.78$
$r_9 = -6.4729$
$d_9 = 0.1477$
$r_{10} = \infty$
$d_{10} = 1.1078$    $n_{d10} = 1.494$    $v_{d10} = 75$
$r_{11} = \infty$
$d_{11} = 0.541$
$r_{12} = \infty$
$d_{12} = 0.7386$    $n_{d12} = 1.883$    $v_{d12} = 40.76$
$r_{13} = \infty$
$d_{13} = 0.4707$
$|f_2/f| = 7.29, |f_3/f| = 2.54, |d_F/f| = 1.6, IH/f = 0.88,$
$d_{23}/f = 1.58$ Tenth Embodiment FIG. 15 is a sectional view showing the arrangement, developed along the optical axis, of an objective lens for endoscopes in the tenth embodiment of the present invention.

In FIG. 15, this objective lens system comprises a front lens unit component G101 and a rear lens unit component G102, between which an aperture stop S is located. The front lens unit component G101 comprises, in order from the object side, a first lens component L101 having a negative refractive power and a second lens L102 having a positive refractive power which directs a surface of the small radius of curvature toward the object side, and a rear lens unit component G102 comprises a third lens L103 having a positive refractive power which directs a surface of the small radius of curvature toward the image side, a fourth lens L104 having a positive refractive power and a fifth lens L105 having a negative refractive power. The fourth lens L104 and the fifth lens L105 are cemented. The stop S is positioned on the side of the second lens L102. Between the third lens L103 and the fourth lens L104, a filter FL is arranged. Behind the fifth lens L105, a plane parallel plate PP is arranged. The filter FL is an infrared cutoff filter.

Figure 16:
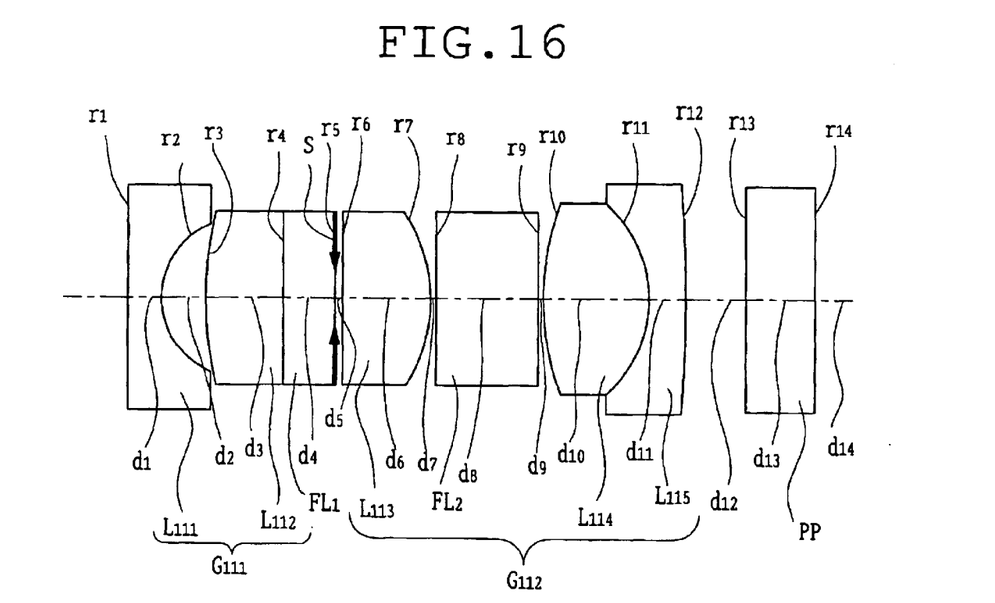
FIG. 16 is a sectional view showing the optical arrangement, developed along the optical axis, of an objective lens for endoscopes in an eleventh embodiment of the present invention.
Figure 17A:
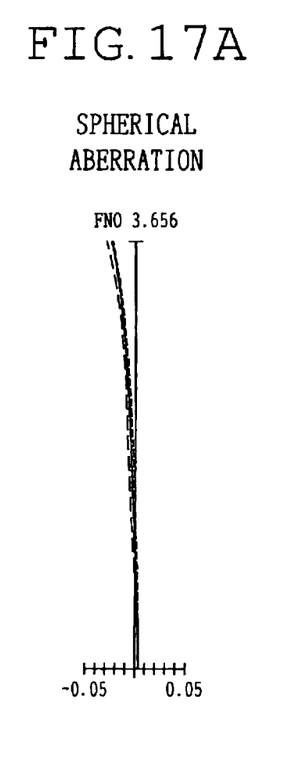
FIGS. 17A–17E are views respectively showing the spherical aberration, the astigmatism, the axial chromatic aberration, the coma (M) and the coma (S) in the first embodiment of an objective lens for endoscopes according to the present invention.
Figure 17B:
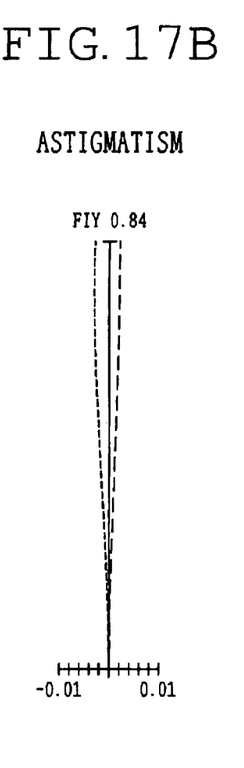
Figures 17C, 17D:
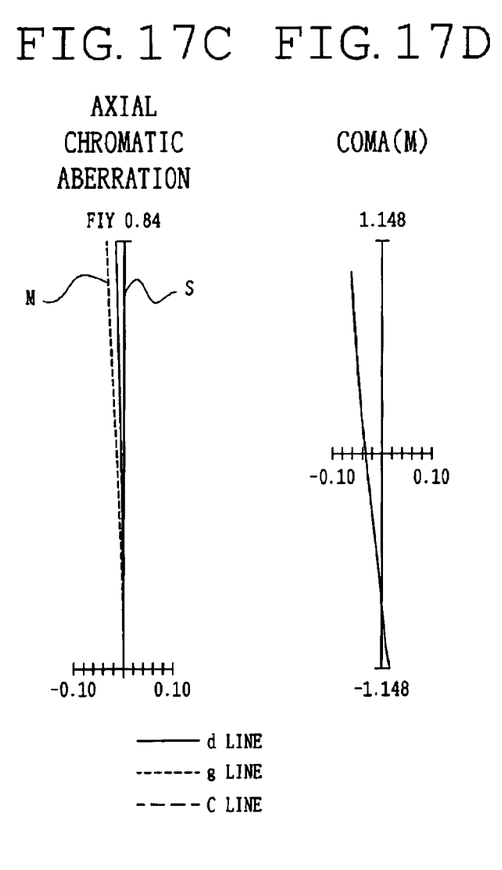
Figure 17E:
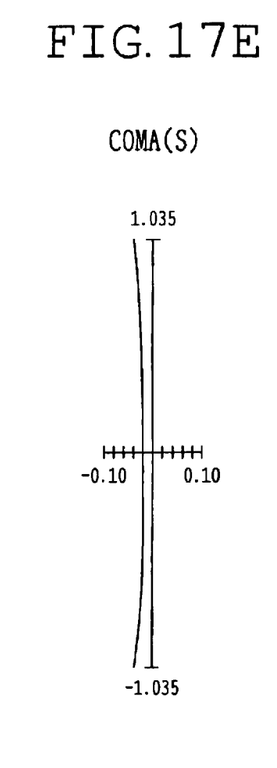

Numeral data 10 focal length f = 1 mm, Fno. = 3.61, field angle ω = 118°
$r_1 = \infty$
$d_1 = 0.3631$    $n_{d1} = 1.883$    $v_{d2} = 40.76$
$r_2 = 0.7413$
$d_2 = 0.3268$
$r_3 = 2.1268$
$d_3 = 1.18$    $n_{d3} = 1.51633$    $v_{d3} = 64.14$
$r_4 = \infty$ (stop)
$d_4 = 0.0545$
$r_5 = \infty$
$d_5 = 0.9077$    $n_{d5} = 1.883$    $v_{d5} = 40.76$
$r_6 = -1.779$
$d_6 = 0.0545$
$r_7 = \infty$
$d_7 = 1.0892$    $n_{d7} = 1.518$    $v_{d7} = 75$
$r_8 = \infty$
$d_8 = 0.0545$
$r_9 = 2.4284$
$d_9 = 1.0892$    $n_{d9} = 1.72916$    $v_{d9} = 54.68$
$r_{10} = -1.3261$
$d_{10} = 0.3631$    $n_{d10} = 1.84666$    $v_{d10} = 23.78$
$r_{11} = -13.3039$
$d_{11} = 0.5319$
$r_{12} = \infty$
$d_{12} = 0.7261$    $n_{d12} = 1.883$    $v_{d12} = 40.76$
$r_{13} = \infty$
$d_{13} = 0.4628$
$|f_2/f| = 4.12, |f_3/f| = 2.01, |d_F/f| = 1.3, IH/f = 0.87,$
$d_{23}/f = 1.31$ Eleventh Embodiment FIG. 16 is a sectional view showing the arrangement, developed along the optical axis, of an objective lens for endoscopes in the eleventh embodiment of the present invention.

In FIG. 16, this objective lens system comprises a front lens unit component G111 and a rear lens unit component G112, between which an aperture stop S is located. The front lens unit component G111 comprises, in order from the object side, a first lens L111 having a negative refractive power and a second lens L112 having a positive refractive power which directs a surface of the small radius of curvature toward the object side, and a rear lens unit component G112 comprises a third lens L113 having a positive refractive power which directs a surface of the small radius of curvature toward the image side, a fourth lens L114 having a positive refractive power and a fifth lens L115 having a negative refractive power. The fourth lens L114 and the fifth lens L115 are cemented. In this embodiment, between the second lens L112 and the third lens L113, a first filter FL1 is arranged and between the third lens L113 and the fourth lens L114, a second filter FL2 is arranged. The filter FL1 is a laser cutoff filter and the second filter FL2 is an infrared cutoff filter. And Behind the fifth lens L115, a plane parallel plate PP is arranged. In this embodiment, the stop S is positioned on the surface of the image side of the filter FL1 ($r_5$) facing the second lens L112.

| Numeral data 11 | | | |
|---|---|---|---|
| focal length f = 1 mm, Fno. = 3.65, field angle ω = 131° | | | |
| $r_1 = \infty$ | | | |
| $d_1 = 0.3917$ | $n_{d1} = 1.883$ | | $v_{d2} = 40.76$ |
| $r_2 = 0.8657$ | | | |
| $d_2 = 0.4896$ | | | |
| $r_3 = 4.5973$ | | | |
| $d_3 = 0.8813$ | $n_{d3} = 1.51633$ | | $v_{d3} = 64.14$ |
| $r_4 = \infty$ | | | |
| $d_4 = 0.5876$ | $n_{d4} = 1.52287$ | | $v_{d4} = 59.89$ |
| $r_5 = \infty$ (stop) | | | |
| $d_5 = 0.0588$ | | | |
| $r_6 = \infty$ | | | |
| $d_6 = 0.9947$ | $n_{d6} = 1.883$ | | $v_{d5} = 40.76$ |
| $r_7 = -1.9516$ | | | |
| $d_7 = 0.0588$ | | | |
| $r_8 = \infty$ | | | |
| $d_8 = 1.1751$ | $n_{d8} = 1.518$ | | $v_{d8} = 75$ |
| $r_9 = \infty$ | | | |
| $d_9 = 0.0588$ | | | |
| $r_{10} = 3.029$ | | | |
| $d_{10} = 1.1751$ | $n_{d10} = 1.72916$ | | $v_{d10} = 54.68$ |
| $r_{11} = -1.4244$ | | | |
| $d_{11} = 0.3917$ | $n_{d11} = 1.84666$ | | $v_{d11} = 23.78$ |
| $r_{12} = -10.1498$ | | | |
| $d_{12} = 0.6724$ | | | |
| $r_{13} = \infty$ | | | |
| $d_{13} = 0.7834$ | $n_{d13} = 1.883$ | | $v_{d13} = 40.76$ |
| $r_{14} = \infty$ | | | |
| $d_{14} = 0.4993$ | | | |
| $\|f_2/f\| = 8.9$, $\|f_3/f\| = 2.21$, $\|d_F/f\| = 1.66$, IH/f = 0.94, | | | |
| $d_{23}/f = 1.55$ | | | |

Each aberration of the objective lens in the first embodiment is shown in FIG. 17, respectively. The color correction filter such as an infrared cutoff filter and the laser cutoff filter which cuts off the ray such as an YAG laser in the ninth to eleventh embodiments may be positioned singularly.

Besides, these may be positioned as a cemented filter unit. If the positioning of these filters is needless, these maybe replaced with an air-converted length which is equivalent to a plane parallel plate.

Besides, the glass material with low refractive index and low dispersion may be used in the second lens in the each embodiment according to the present invention. Thus, these second lenses can be configured as a color correction filter such as an infrared cutoff filter. The embodiments 1, 2, 5 and 6 show examples of the second lens L12, L22, L52 and L62 configured from a filter lens.

What is claimed is:

1. An objective lens for endoscopes comprises a front lens unit component and a rear lens unit component, between which a stop is located, wherein the front lens unit component comprises, in order from the object side, a first lens having a negative refractive power, and a second lens having a positive refractive power which directs a surface of the small radius of curvature toward the object side; wherein the rear lens unit component comprises a third lens having a positive refractive power which directs a surface of the small radius of curvature toward the image side, a fourth lens having a positive refractive power, and a fifth lens having a negative refractive power; and wherein the fourth lens and the fifth lens are cemented, and satisfying the following condition:

$$2.0<|f_3/f|<3.0$$

where f is the composite focal length of the total system and $f_3$ is the focal length of the third lens.

2. An objective lens for endoscopes according to claim 1, satisfying the following condition:

$$1.0<|d_F/f|<1.8$$

$$0.8<IH/f<1.2$$

where $d_F$ is the distance from a top surface of the large radius of curvature of the first lens to the stop (an air-converted length) and IH is the maximum image height on the imaging surface.

3. An objective lens for endoscopes according to claim 2, satisfying the following condition:

$$3.0<|f_2/f|<10.0$$

where $f_2$ is a focal length of the second lens.

4. An objective lens for endoscopes according to claim 2, satisfying the following condition:

$$n_2<1.6 \text{ and } v_2>50$$

where $n_2$ is the d-line refractive index of the second lens and $v_2$ is the d-line Abbe's number of the second lens.

5. An objective lens for endoscopes according to claim 2, satisfying the following condition:

$$1.2<d_{23}/f<1.7$$

where $d_{23}$ is the distance from a top surface of the small radius of curvature of the second lens to that of the third lens (an air-converted length).

6. An objective lens for endoscopes according to claim 1, satisfying the following condition:

$$3.0<|f_2/f|<3.0$$

where $f_2$ is a focal length of the second lens.

7. An objective lens for endoscopes according to claim 1, satisfying the following condition:

$$n_2<1.6, v_2>50$$

where $n_2$ is the d-line refractive index of the second lens and $v_2$ is the d-line Abbe's number of the second lens.

8. An objective lens for endoscopes according to claim 1, satisfying the following condition:

$$1.2<d_{23}/f<1.7$$

where $d_{23}$ is the distance from a top surface of the small radius of curvature of the second lens to that of the third lens (an air-converted length).

9. An objective lens for endoscopes according to claim 5, satisfying the following condition:

$$1.3<d_{23}/f<1.6$$

where $d_{23}$ is the distance from a top surface of the small radius of curvature of the second lens to that of the third lens (an air-converted length).

10. An objective lens for endoscopes according to claim 8, satisfying the following condition:

$$1.3<d_{23}/f<1.6$$

where $d_{23}$ is the distance from a top surface of the small radius of curvature of the second lens to that of the third lens (an air-converted length).

11. An objective lens for endoscopes according to claim 2, wherein the surface of the object side of the third lens is flat.

12. An objective lens for endoscopes according to claim 11, wherein the stop is closely fixed on the third lens.

* * * * *

UNITED STATES PATENT AND TRADEMARK OFFICE
CERTIFICATE OF CORRECTION

PATENT NO. : 6,956,703 B2
APPLICATION NO. : 10/855484
DATED : October 18, 2005
INVENTOR(S) : Saito It is certified that error appears in the above-identified patent and that said Letters Patent is hereby corrected as shown below:

| Column | Line | |
|---|---|---|
| 16 | 36 | Change "<3.0" to - <10.0 –. |

Signed and Sealed this

Eighth Day of August, 2006

JON W. DUDAS
*Director of the United States Patent and Trademark Office*